UNITED STATES PATENT OFFICE.

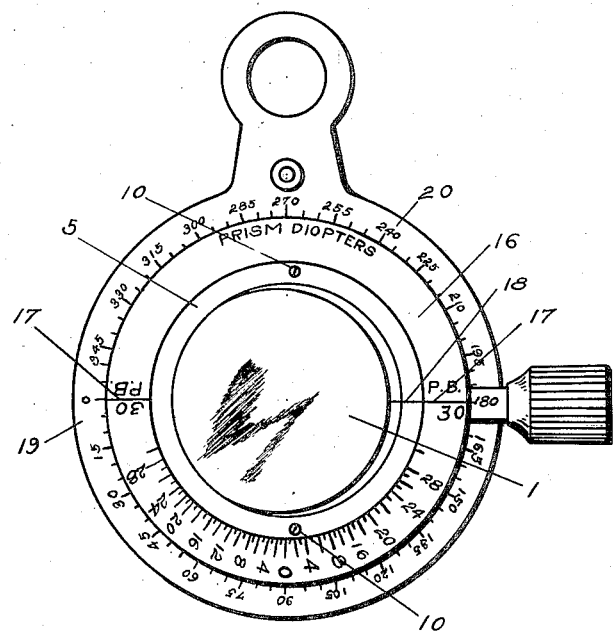
Fig. I
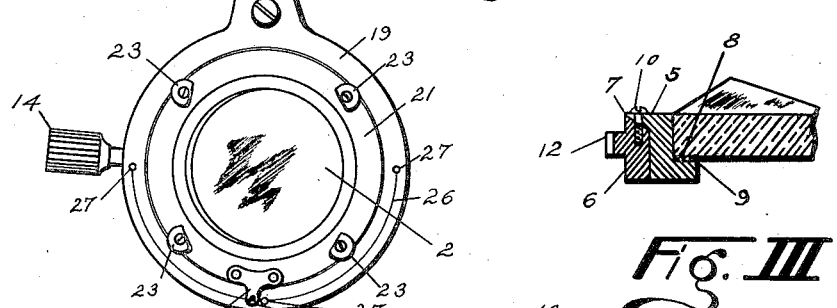
Fig. II    Fig. III
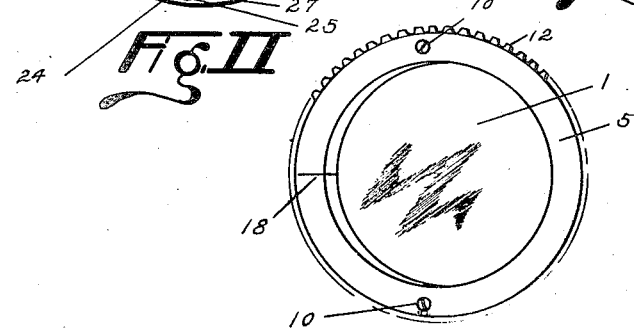
Fig. IV
INVENTOR
H.L. DEZENG
BY
Harry H. Styll.
ATTORNEY

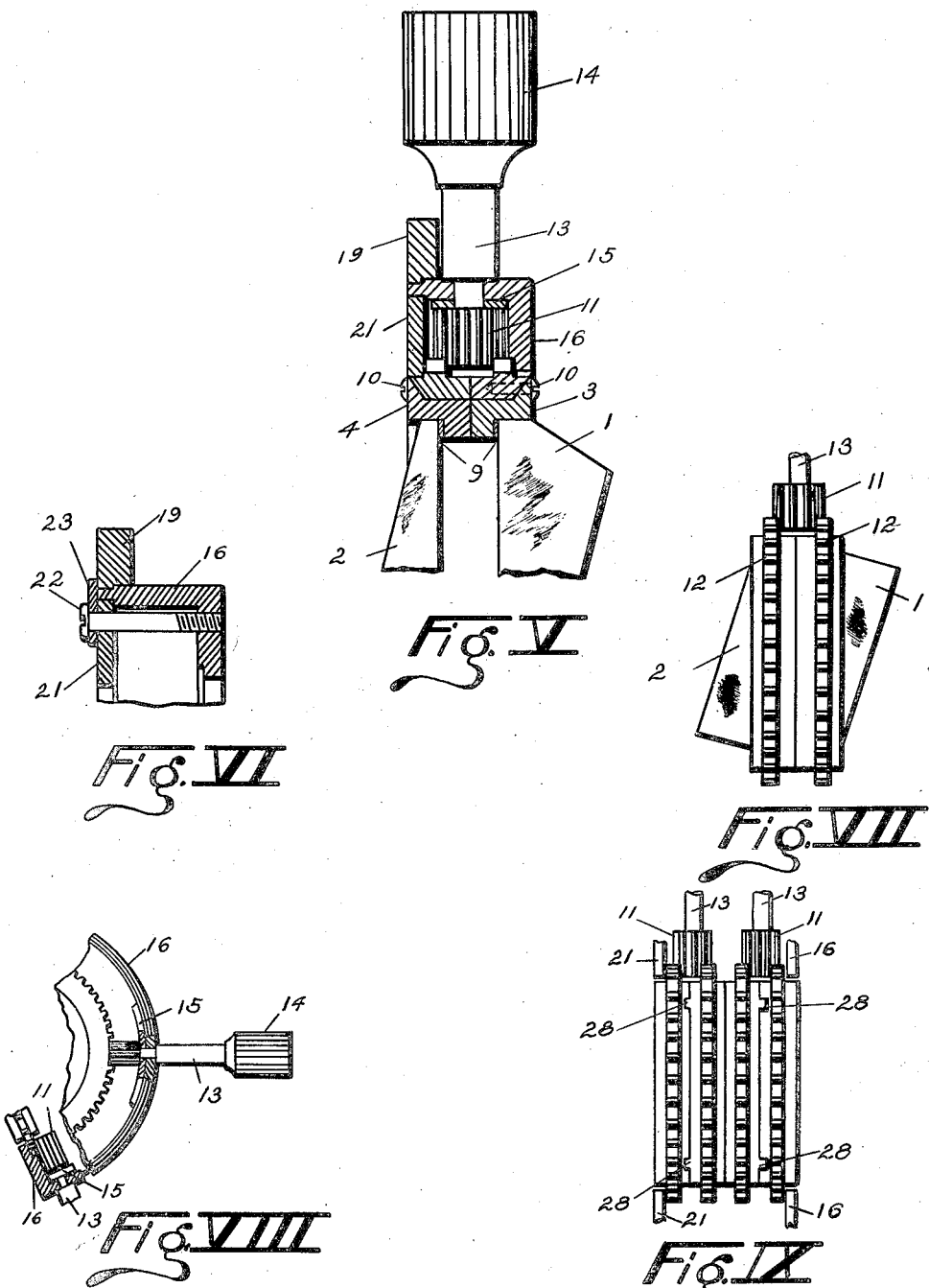

HENRY L. DE ZENG, OF MOORESTOWN, NEW JERSEY.

OPTICAL INSTRUMENT.

1,423,091.  Specification of Letters Patent.  Patented July 18, 1922.

Application filed May 21, 1920. Serial No. 383,058.

*To all whom it may concern:*

Be it known that I, HENRY L. DE ZENG, a citizen of the United States, residing at Moorestown, in the county of Burlington and State of New Jersey, have invented certain new and useful Improvements in Optical Instruments, of which the following is a specification.

This invention relates to improvements in optical instruments and has particular reference to an improved form of multiple lens unit for use in an instrument such as is used by oculists and opticians in testing and examining eyes.

The object of the present invention is to provide a mount for holding lenses in the unit, from which mount the lenses may be easily removed or replaced without interference with or taking down or separating other parts of the unit or its mechanism.

A further object of the invention consists in mounting two opposed prisms each in a separate mount within a casing having driving mechanism which will rotate the prisms in opposite directions so any power of prism may be obtained from zero to the maximum and arranging the mounts in which the prisms are held so that either or both of the prisms may be removed from the mount without deranging any other part of the mechanism, so the removed prism may be cleaned and leaving the other lens within the mounting also accessible for cleaning, thus providing improved and facile means for eradicating fogged or blurred conditions which will occur on the internal faces of prisms or other lenses when mounted in this way.

Other objects and advantages of my improved instrument include the simplification of parts and the various structural features and details by which the foregoing advantages may be accomplished in a practical manner and should be apparent by reference to the following specification taken in connection with the accompanying drawings in which the preferred form of the instrument and its parts is shown and described for the sake of illustration, but it will be understood that I may make any modifications in the specific details of construction shown and described within the scope of the appended claims without departing from or exceeding the spirit of the invention.

Figure I represents a front or face view of the instrument inverted.

Figure II represents a back or rear view inverted.

Figure III represents a fragmentary cross section of the lens and lens mount.

Figure IV represents a top or plan view of Figure III.

Figure V is a fragmentary cross section on an enlarged scale through the instrument showing the lens mounts and casing.

Figure VI is a fragmentary cross section of the holding element showing the means of holding it together.

Figure VII is an elevation or end view of the two lens mounts showing the driving mechanism.

Figure VIII represents fragments of plan and cross section of a portion of the holding element showing the mechanism for driving the lens mounts.

Figure IX is similar to Figure VII but shows four lens mounts instead of two.

It is a well known fact that highly polished surfaces of lenses are very susceptible to temperature changes and are liable to become fogged and blurred due to condensation on their surfaces. They also may become scratched and blurred by the collection of dirt particles or other foreign matter collecting on their surfaces.

Prior to my present invention the lenses in alterable lens units used extensively in optical and eye testing instruments, have been so held in their mounts that it was impossible to remove the moisture, dust or dirt from their inner surfaces, or to replace broken or cracked lenses without taking the whole instrument down and removing much of its mechanism. As the mechanisms of these instruments are small and delicate it was practically impossible for anyone but an instrument maker to take down and put up these parts without liability of injury to the instrument proper or the derangement of its optical properties.

Therefore, as the lenses in these instruments when in use frequently require cleaning, it was exceedingly difficult for the practitioner or operator to keep them in condition for use without sending them back to the makers for attention and in some instances necessitating the purchase of double equipment so that the operator might have a usable instrument while the other was at the factory being cleaned. This condition has been the subject of general complaint from the first and while attempts may have been made to remedy it so far as I am aware no practical solution has even been offered prior to my present invention.

Referring to the drawings, in which similar characters of reference are employed to denote corresponding parts throughout the several views, the following is a description and method of operation of the preferred form of my instrument which is described by way of illustration.

Two prisms, 1 and 2, are mounted back to back in rotating lens mounts 3 and 4. The lens mount, see Figure III, is composed of two rings 5 and 6, the ring 5 bevelled off at its upper edge 7 to fit a corresponding bevel in the ring 6, and the inner edge of the ring 5 is cut away to form the shelf 8 on which the lens is held by means of pitch or cement or other adhesive 9. The rings 5 and 6 are held together by screws 10. It will be noted in Figure IV that the screws 10 are placed off center, that is they are not placed on the center lines of the mount, the object being to insure that when the ring 5 is placed in the ring 6 it will always be placed therein in the same relative position, that is to say, if the screws were placed on the center line the position of the ring 5 in the ring 6 might be reversed and the lens placed in the wrong position without it being noticed, whereas if the screws are off center it is impossible to reverse the position and the ring 5 will always take the same relative position with regard to the ring 6.

The lenses are rotated by means of a pinion 11, Figures V and VII, which interlocks with gear wheel sections 12 around the periphery of the ring 6. It will be noted that the pinion 11 lying between the gears 12 engaging both in similar manner, will insure that the lenses 1 and 2 are driven in opposite directions. The pinion 11 is turned by means of a driving rod 13 having an enlarged finger drive 14 at its end. Backlash or play in the pinion is prevented by means of a spring 15, see Figure VIII, placed between one end of the pinion and the casing wall.

The lens mounts are held in holding element 16 consisting of a front L-shaped member having a prism diopter scale on its front face and having one of its diameters indicated by a cross mark 17, which cross mark aligns with a similar cross mark on the prism lens and its mount indicated at 18, Figure I. The holding element 16 is fitted to a ring 19 having a degree scale 20 on its outer face, which degree scale matches with the indicator 17 on the casing 16. The holding element 16 is fitted into the ring 19 in such a way as to have rotative engagement therewith whereby the diopter scale may be moved around the degree scale.

The back of the holding element is formed by an annular ring 21 which is held in place in the holding element by means of screw bolts 22 extending through washers 23, which washers overlap both the back 21 and the ring 19, as is best shown in Figure II and VI. On the back ring 21 is a spring retention finger 24, see Figure II. A projecting tongue 25 on this finger fits in a groove 26 in the ring 21 and is adapted to enter depressions 27, three of which are shown in Figure II located 90 degrees apart. The engagement of the finger 25 and the depressions 27 acts as a stop for the rotation of the alterable lens unit within the degree scale ring comprising its mounting.

The lens mounts with their gear wheels are held in place in the holding element by engagement with the flange 16 on the front and the back plate 21 and are held snugly in place so as to prevent undue movement or lost play, both in its edge bearings and transversely.

It will further be noted that in Figure VII two lens mounts are shown, while in Figure IX four lens mounts are shown, indicating that my invention may be used either with a single mount or with a plurality of mounts in accordance with the powers of lenses desired and the cases for which it is adapted to be fitted. Where multiple mounts are used, as in Figure IX they may be held in alinement by intermeshing with each other, as indicated by the peripheral ridges or annular rings 28 on the face of one gear fitting into the face of the other.

It will also be noted, see Figure V, that the outer face of the lens mounts 3 and 4 are in alinement with the front and rear faces of the portions 16 and 21, thus presenting a flush appearance to the eye, only the lens projecting beyond the holding element. It will also be noted that the lens mounts are capable of opposite rotation in the holding element, whereas the holding element is in turn rotatable in the degree scale ring 19.

The operation of the instrument is as follows:

The lenses are rotated in opposite directions by means of the finger drive 14, the prism diopters being obtained by means of the indicated line 18 on the prism and its cell coming in contact with the prism diopter scale on the front of the holding element 16. The holding element holding the prisms and containing the prism diopter scale in turn may be rotated in the degree scale ring 19.

the spring 25 and the stops 27 indicating cardinal points in the rotations. The lens gear mounts may be entirely removed by taking off the back ring 21, after removing the screws 22 and the washers 23. This also allows the holding element 16 to be removed from the degree ring 19. Owing to the smallness of the parts and the large number of teeth on the periphery of the gear mounts it is very difficult to reassemble the instrument so the original inter-relationship between the movable parts will obtain and the lenses function as required.

Should the inner faces of the lenses or prisms become blurred, fogged, dirty, dusty or require any attention or cleaning, or should they become scratched or broken and require replacing, they may be taken out of or removed from the unit without removing the lens gear mounts from the instrument. The removed lens may be cleaned and also the lens remaining in the instrument may be cleaned as the inner surfaces have now become accessible. The lens is removed from the lens gear mount by taking out the screws 10, see Figures IV and V, and removing the ring 5 from the gear ring 6 of the mount. As the screws 10 are located in the mount ring 5 off center the ring can only be replaced in the ring 6 in exactly the same way it came out, hence avoiding any possibility of mistake and getting the lens in the wrong relative position.

The lens is replaced in the instrument by returning the ring 5 to the ring 6 and putting back the screws 10. In this way the front or back lens may be taken out or only the front lens may be mounted in the separable or two part mount, the rear lens being in a solid or one piece mount. It is also clear that this manner of taking out the lenses is applicable to cases where several mounts are used as well as to one where a single mount or two mounts are used, see Figures VII and IX.

From the above description it will be seen that I have provided in an instrument of this kind, extremely simple means for accessibility to the inner faces of the outside lenses without taking down the rest of the instrument, and more facile arrangements for reaching internal lenses, where single mounts or a plurality of mounts are used, thus providing means by which the instrument may be kept in perfect condition by one unskilled in mechanics or by the ordinary operator, avoiding the necessity of carrying double equipment by the operator and reducing to a minimum the necessity of returning the instrument to the shop for repairs.

Having described my invention, what I claim is:

1. In a device of the character described, a holding element, a pinion mounted in the holding element, means for turning the pinion, a pair of separated annular rings mounted in the holding element and having gear teeth therearound adapted to mesh with the opposite sides of the pinion whereby rotation of the pinion will rotate the rings in opposite directions, a second pair of rings mounted in the first pair of rings and out of engagement with the holding element, removable means for securing the second pair of rings to the first whereby the second pair of rings may be removed from the device without removing the first pair of rings from the holding element, and a pair of lenses mounted in the second pair of rings.

2. In a device of the character described, a holding element, a pinion mounted in the casing, means for turning the pinion, a pair of separated annular rings mounted in the holding element and having gear teeth therearound adapted to mesh with the opposite sides of the pinion whereby rotation of the pinion will rotate the rings in opposite directions, a second pair of rings mounted in the first pair of rings and out of engagement with the casing, removable means for securing one of the second pair of rings to the first whereby one of the second pair of rings may be removed from the device without removing the first pair of rings from the holding element, and a pair of lenses mounted in the second pair of rings.

3. In a device of the character described, a holding element, an annular ring rotatably mounted in the holding element, a second ring mounted within the first ring and out of engagement with the holding element, removable means for securing the second ring within the first whereby it may be removed without removing the first ring from the holding element, a lens secured in the second ring, and interacting guide means between the first and second rings adapted to permit the removed ring to be replaced only in its initial position.

4. In a device of the character described, a holding element comprising front and back cover sections each having annular guide ways, means for securing the covers together, lens mounts secured in place in the guide ways of the casing and comprising guide rings engaging the guides in the holding element and rotative therein, lens rings in the guide rings adapted to hold lenses, separable means for locking the guide and lens rings together, lenses in the lens rings, gear teeth surrounding the guide rings of the lens mounts, a pinion for engaging the gear teeth, and means for operating the pinion.

5. In a device of the character described, a holding element, a pair of aligned lenses mounted in the holding element, the mounting for one of said lenses comprising an annular ring rotatably mounted in the holding element, a second ring mounted in the first ring and out of engagement with the holding element, removable means for securing the second ring within the first whereby it may be removed without removing the first ring or the other lens from the holding element, and means for holding the lens.

In testimony whereof I have affixed my signature, in presence of two witnesses.

HENRY L. DE ZENG.

Witnesses:
S. W. CAFFERTY,
EDNA McDEVITT.